US006898647B2

(12) United States Patent
Duvvuru

(10) Patent No.: US 6,898,647 B2
(45) Date of Patent: May 24, 2005

(54) PARALLEL BYTE PROCESSING ENGINES SHARED AMONG MULTIPLE DATA CHANNELS

(75) Inventor: Ramesh Duvvuru, San Jose, CA (US)

(73) Assignee: Redback Networks Inc., San Jose, CA (US)

(*) Notice: Subject to any disclaimer, the term of this patent is extended or adjusted under 35 U.S.C. 154(b) by 591 days.

(21) Appl. No.: 09/828,573

(22) Filed: Apr. 2, 2001

(65) Prior Publication Data

US 2002/0141450 A1 Oct. 3, 2002

(51) Int. Cl.[7] .......................... G06F 13/00; G06F 13/14
(52) U.S. Cl. ........................... 710/33; 710/30; 710/34; 710/52; 710/58; 370/470; 709/236
(58) Field of Search .............................. 710/30, 33, 34, 710/52, 58; 370/470; 709/236

(56) References Cited

U.S. PATENT DOCUMENTS

| 5,040,170 A | * | 8/1991 | Upp et al. ..................... 398/50 |
| 5,144,623 A | * | 9/1992 | Bernardini .................. 370/470 |
| 5,784,649 A | * | 7/1998 | Begur et al. .................. 710/52 |
| 5,878,057 A | * | 3/1999 | Maa ............................ 714/757 |

FOREIGN PATENT DOCUMENTS

EP           147086 A2 *  7/1985    ........... H04L/11/00

OTHER PUBLICATIONS

Bagheri et al., "Gb/s Framer/Demultiplexer IC for SONET STS–192 Applications", IEEE 1995 Custom Integrated Circuits Conference (22.1.1–22.1.4).*
Robe, Thomas J., "A SONET STS–3c User Network Interface Integrated Circuit", Jun. 1991, IEEE, vol. 9, No. 5.*

* cited by examiner

*Primary Examiner*—Kim Huynh
*Assistant Examiner*—Angel L. Casiano
(74) *Attorney, Agent, or Firm*—Blakely, Sokoloff, Taylor & Zafman LLP

(57) ABSTRACT

A method and apparatus for processing bytes received from a data stream includes multiple parallel byte processing engines that simultaneously process a first set of bytes received from a data channel during a first cycle and simultaneously process a second set of bytes received from the data channel during a second cycle. The method and apparatus further includes a state memory for storing byte information pertaining to the first set of bytes. When processing HDLC protocol bytes, the multiple parallel byte processing engines process the first and second set of bytes to identify at least one delineating byte contained within the data channel in accordance with a HDLC protocol. When processing ATM cell bytes, the method and apparatus further includes multiple parallel quad-byte processing engines for calculating cell delineation values, and multiple comparators for comparing the calculated cell delineation values with respective bytes from the second set of bytes to identify ATM start bytes contained in the first set of bytes.

15 Claims, 6 Drawing Sheets

PARALLEL BYTE PROCESSING ENGINES SHARED AMONG MULTIPLE DATA CHANNELS

FIELD OF THE INVENTION

The invention relates to digital optical networks, and more particularly, to a method and system for processing bytes transmitted through digital optical networks.

BACKGROUND OF THE INVENTION

Digital optical networks such as synchronous optical network (SONET) and synchronous digital hierarchy (SDH) provide the predominant transmitting and multiplexing standards for high-speed signals used in communications and computer networks today. SONET is the most widely used standard in North America and it is often said that SDH is the international version of SONET. These two standards are compatible with one another and essentially transmit data using the same protocols and architecture. Although terminology between the two standards varies, both the SONET and SDH architectures format data into high-speed frames, each having a standard number of bytes. For simplicity's sake, a brief discussion of the SONET data structure using SONET terminology is provided below.

The basic building block of a SONET digital transmission system is a synchronous transport level one, or STS-1, frame which consists of 9 rows by 90 columns of bytes, for a total of 810 bytes. The frames are transmitted at a rate of 8,000 frames per second (or once every 125 microseconds) to provide a 51.84 Mbps signal rate. The STS-1 frame is transmitted one row at time, from top to bottom, and from left to right within each row. Therefore, the byte in row 1, column 1 is sent first, and the byte in row 9, column 90 is sent last. After the 90th byte is sent at the end of row 1, the next byte sent is the first byte in row 2, the byte in column 1. Because one frame is sent every 125 microseconds, SONET can maintain time-slot synchronization that is required for delivery of PCM voice data (8 bits at 8,000 times per second or 64 kbps). SONET also adheres to frame synchronization time with asynchronous network standards such as DS-1, E-1, and DS-3.

FIG. 1 illustrates the data format for a SONET STS-1 frame 100 having 9 rows by 90 columns of bytes (otherwise referred to as "octets"). The first three columns 102 are allocated for transport overhead (TOH) information which includes section overhead (SOH) and line overhead (LOH) data. As is known in the art, SOH data deals with the transport of an STS frame across the physical medium and controls functions such as framing the SONET data stream, scrambling and error monitoring. The LOH data deals with the reliable transport of the payload between line terminating equipment. The remaining 87 columns of the STS-1 frame consist of 783 octets (9 rows×87 columns) that are allocated for "user" data, otherwise referred to as the "payload." The structure of the payload is defined by a synchronous payload envelope (SPE) 200 which contains 783 octets of data and is transmitted at 8,000 times per second. The first column 112 of SPE 110 contains additional overhead information, commonly referred to as path overhead (POH) data, as well as the actual user data. The POH data 112 is stored in one "column" or nine bytes of the SPE. The first POH byte indicates the first byte of the SPE. The POH data is used to monitor and manage the transport of network services such as DS1 or DS3, for example, between path terminating equipment (PTE).

Higher rate SONET formats essentially follow the same format of the STS-1 frame. All SONET frames contain exactly nine rows and are transmitted at 8,000 times per second. The only variable is the number of columns, or subcolumns. For example, an STS-3 frame consists of 9 rows and is sent 8,000 times per second; however, an STS-3 frame is not 90 columns wide, but is three times wider. Therefore, the STS-3 frame is 270 columns wide and its corresponding transmission rate is 155.52 Mbps. The STS-3 overhead columns are multiplied by three as well, as are the SPE capacity columns. Typically, the STS-3 frame comprises three STS-1 signals interleaved as alternating columns within the STS-3 frame. Therefore, the first column of the STS-3 frame is the first column of a first STS-1 signal, the second column of the STS-3 frame is the first column of a second STS-1 signal, and so on. Similarly, higher order STS-N formats (e.g., STS-12, STS-48, etc.) have proportionally wider frame formats containing a greater number of interleaved columns and faster bit transmission rates. Today, a STS-192 signal can transmit data at a rate of 9.953 Gbps!

With the ever-increasing bandwidths of digital signals being provided by optical networks, the required speed and power of processors to handle these high-bandwidth data streams has been a constant challenge to processor designers and engineers. One of the primary limitations for handling higher bandwidth data streams is the ability of the processors to handle such enormous quantities of data. Therefore, there is a constant need to provide faster and more powerful processing engines to handle the higher-bandwidth signals capable of being transmitted in digital optical networks today.

SUMMARY OF THE INVENTION

The invention addresses the above and other needs by providing a plurality of parallel byte processing engines for simultaneously processing in parallel a plurality of bytes received from frames transmitted via a digital optical network. The bytes may be processed in accordance with a high-level data link control (HDLC) or asynchronous transfer mode (ATM) protocol, depending on the format the bytes were transmitted. When processing HDLC bytes, each of the plurality of parallel byte processing engines communicate with their neighbor processing engines to check the value or status of neighboring bytes being processed, delineate the frame, and perform HDLC protocol processing. When processing ATM cell bytes, the plurality of parallel processing engines provide a plurality of bytes from two cycles, or pipelines, to a plurality of quad-processing engines which perform cell delineation calculation, otherwise referred to herein as header error correction (HEC) calculations, to identify start bytes of the ATM cell. By processing multiple bytes in parallel in a single clock cycle, this processor can handle greater bandwidths.

DETAILED DESCRIPTION OF THE INVENTION

The invention is described in detail below with reference to the figures wherein like elements are referenced with like numerals throughout. The invention comprises a novel apparatus and method for processing bytes received from a digital optical network data stream. The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
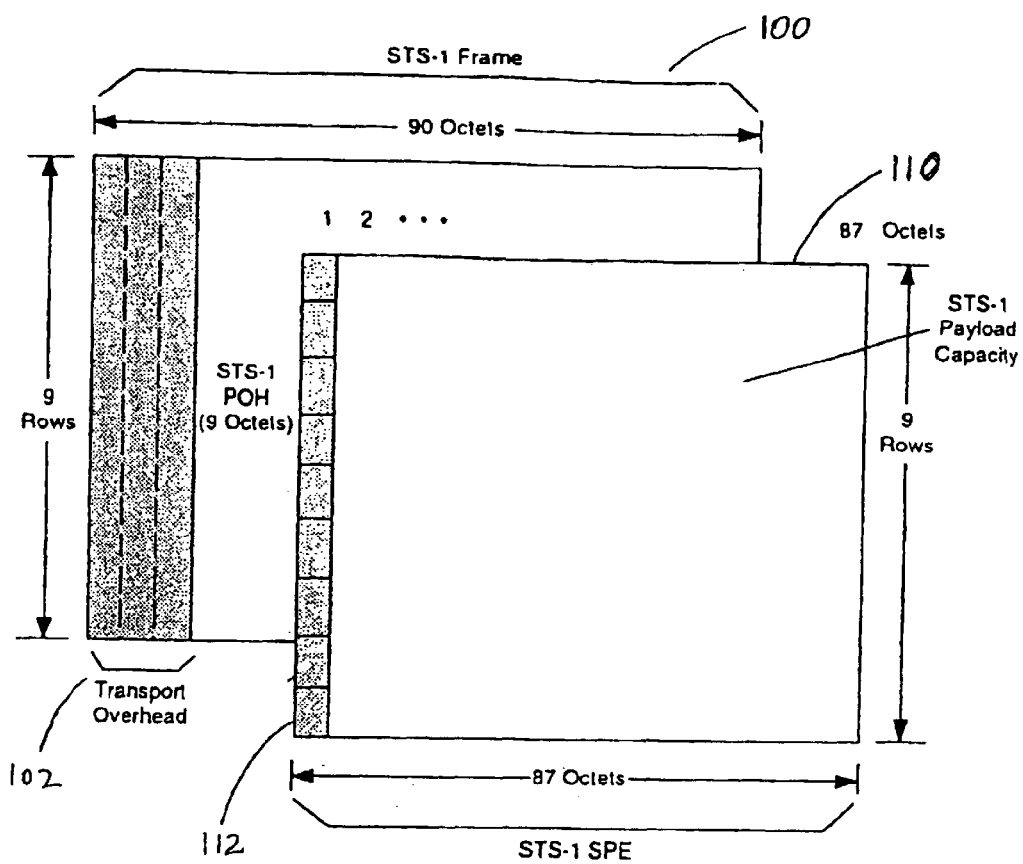
FIG. 1 illustrates a prior art data format for a SONET STS-1 frame having 9 rows by 90 columns of bytes.
Figure 2:
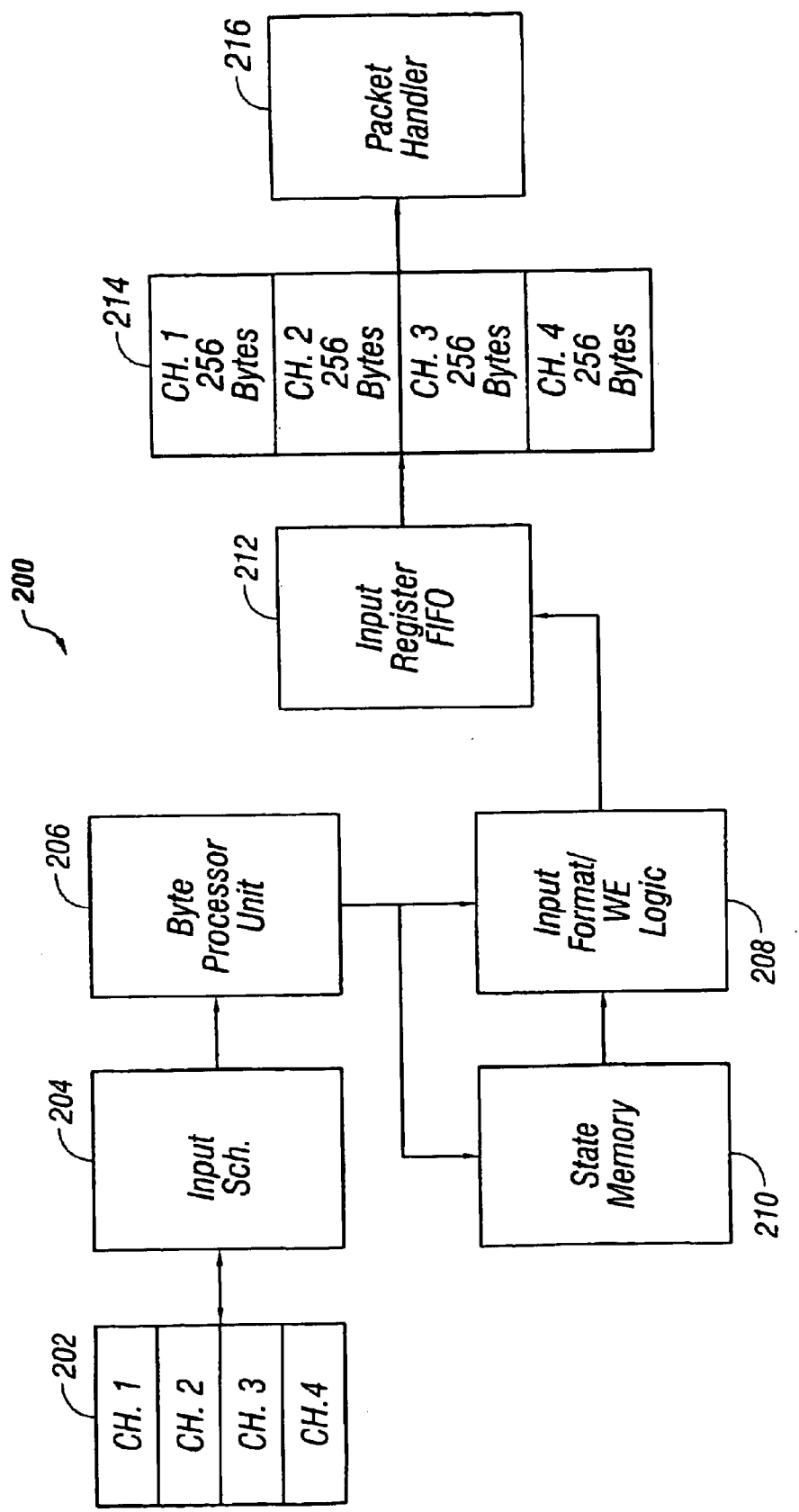
FIG. 2 illustrates a block diagram of a payload termination unit including a byte processing unit in accordance with one embodiment of the invention.

A payload termination unit (PTU) is a device which receives and processes a "payload" (i.e., user data) contained in a SONET data stream. Referring to FIG. 2, a PTU 200, in accordance with one embodiment of the present invention, includes a receiver channelizer unit 202 for demultiplexing a SONET data stream into respective channels contained within the data stream. In the example of FIG. 1, the receiver channelizer unit 202 extracts four channels from the SONET data stream. These packet channels can contain the following data formats: point-to-point protocol (PPP), HDLC, Frame Relay frames, or ATM cells. When the data formats are in accordance with a PPP or Frame Relay protocol, the processing of the bytes in these formats is similar to the processing of bytes received from an HDLC channel. Those of ordinary skill in the art would know, without undue experimentation, how to modify and implement the HDLC processing described below to process PPP or Frame Relay protocol bytes.

In one embodiment, the receiver channelizer unit 202 comprises a plurality of rows for each channel of FIFO memory, with each row being four bytes wide. In one clock cycle, the receiver channelizer unit 202 can receive one to four bytes from a SONET payload, identify a corresponding channel for the received bytes, and place them into a respective FIFO row designated for that particular channel. The PTU 200 further includes an input scheduler unit 204. When a FIFO row has an entry, it asserts a request to the input scheduler 204. In one embodiment, the scheduler 204 is a round-robin scheduler that gives priority to the next "scheduled" channel in the round-robin rotation to access a byte processor unit 206 contained in the PTU 200. Thus if two channels request access to the byte processor unit 206 at the same time, the scheduler 204 gives priority to the channel which is "scheduled" in the round-robin rotation. When the scheduler 204 generates a grant signal for a particular channel, the data contained within the respective channel FIFO, typically four bytes of data, is transported to the byte processor unit 206.

In one embodiment, when a respective channel is identified as a HDLC protocol channel, the byte processor unit 206 simultaneously processes four bytes received from the channel using four parallel byte processing engines to delineate the channel data stream and extract user data, or valid data, that is ultimately processed by a data processor downstream. The byte processor unit 206 determines the byte status of each byte (e.g., whether it is user data, a start or end flag, a stuff byte, etc.) and then transmits each byte to an input formatter 208, along with corresponding byte status data. For each byte determined to be valid user data, the byte status data includes at least one bit indicative of a write enable signal. The input formatter 208 identifies those bytes having write enable signals associated with it as "valid data." Other bytes, such as flag bytes or stuff bytes, are designated as "drop bytes." By determining the location of flag bytes, the input formatter 208 further identifies delineation bytes such as start or end bytes of a packet. Bytes identified as valid data are then written to an input register FIFO 212 where they await to be ultimately transmitted to a processor (not shown) for further processing. Drop bytes are not written into the input register FIFO 212.

In one embodiment, the status of the last byte (e.g., byte 3) of a previous cycle for a respective channel is stored in a state memory 210 to determine whether it is an end-delineation byte (if it is not a flag and the first byte of the current cycle is a flag), or to determine if the first byte of the current cycle is a start-delineation byte (if it is not a flag and byte 3 of the previous cycle is a flag). This type of HDLC processing is described in further detail below with respect to FIGS. 3 and 4.

Figure 3:
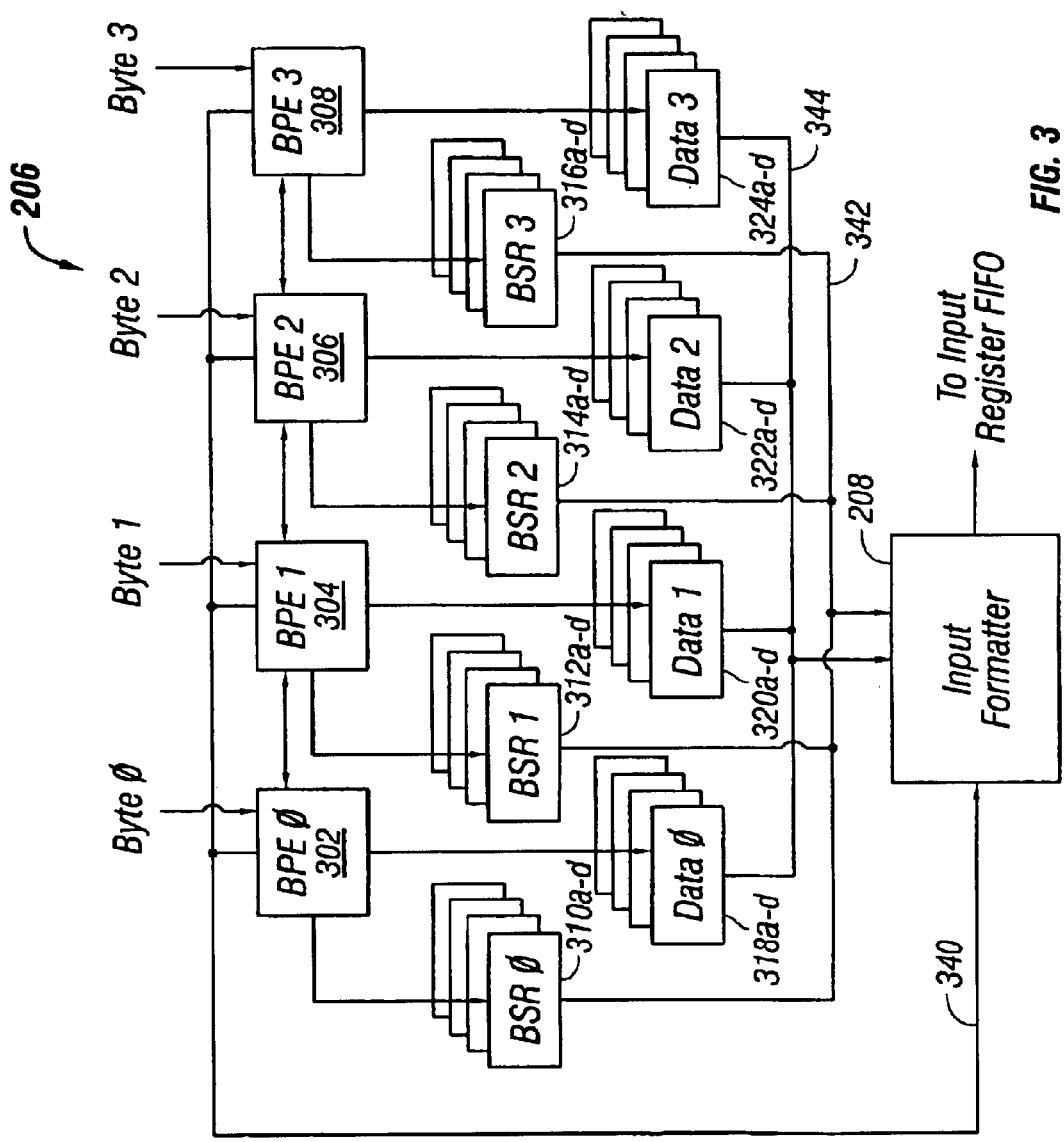
FIG. 3 illustrates a block diagram of the byte processing unit of FIG. 2 including four parallel byte processing engines, in accordance with one embodiment of the invention.

When the respective channel is identified as an ATM protocol channel, the four byte processing engines pass four bytes to respective quad-byte processing engines which access bytes stored in a state memory 210 from a previous cycle and thereafter perform cell delineation calculations using the four bytes of the previous cycle and the bytes of the current cycle to determine the start bytes of the ATM cell. A more detailed description of ATM cell delineation processing is described in further detail below with respect to FIGS. 5 and 6. As described in further detail below, bytes and status data from a previous cycle are stored in the state memory 210 to be accessed by the parallel byte processing engines or quad-byte processing engines as necessary. In one embodiment, the state memory 210 includes a plurality of byte status registers 310–316 (FIG. 3) and a plurality of data registers 318–324 (FIG. 3).

Thus, when processing HDLC bytes, the byte processing unit 206 utilizes the parallel byte processing engines to determine which bytes constitute "drop bytes," which bytes constitute delineation bytes (e.g., the start and end bytes of HDLC packets), and which bytes constitute valid data to be processed. When processing ATM cell bytes, the byte processing unit 206 utilizes the quad-byte processing engines to perform cell delineation calculations on at least "two cycles-worth" of bytes to identify the start bytes of the ATM cell. Bytes received before the start bytes of the ATM cell are designated as "drop bytes." As used herein the term "delineation byte" refers to a start or end byte of a HDLC packet, or a start byte of an ATM cell. A more detailed description of the logic functions performed by the byte processing unit 206 in conjunction with the state memory 210 is provided below with reference to FIGS. 3–6.

As described above, WE signals are generated by the parallel byte processing engines and the quad-byte processing engines for those bytes not designated as "drop bytes." The WE signals are then stored as part of the byte status data for each respective byte transmitted to the input formatter 208. The input formatter 208 further accesses byte status registers 310–316 (FIG. 3) for byte status data for bytes received from a previous cycle, or pipeline, from the same channel. In one embodiment, the input formatter 208 identifies delineation bytes (e.g., HDLC start or end bytes, or ATM start bytes) and generates a three-bit status data. This three-bit status data may be indicative of, for example, a start byte or an end byte. This three-bit status data is then transmitted with each corresponding byte determined to be valid data (e.g., not a "drop byte") to an appropriate bank of registers within the input register FIFO 212 allocated for a corresponding data channel. In one embodiment, if a start byte and an end byte of a HDLC packet have been identified by the parallel byte processing engines, and it is determined that the packet is not at least four bytes long, the input formatter 208 will override the WE signals generated for the bytes in that packet and designate each of the bytes as "drop bytes."

In one embodiment, the input register FIFO 212 includes an eight-deep by eleven-bit register FIFO for each channel. Therefore, for four channels, the input register FIFO 212 includes thirty two (8×4) eleven-bit register FIFO's. Each eleven-bit register can store one byte along with its respective three-bit status code. For a particular channel, up to eight bytes plus eight respective three-bit status codes corresponding to each byte may be stored in the register FIFO bank allocated for that channel. When a register FIFO is four bytes full, or if an end byte of a packet is stored and no new packet is being received in the next immediate cycle, the data corresponding to that channel is moved to an ingress FIFO 214. In one embodiment, only one channel at a time is four bytes full because the register FIFO's are filled by the scheduler 204 one at a time.

In one embodiment, the ingress FIFO 214 includes an eight-deep by thirty-two-byte buffer for each of the four channels of packet data. Thus, each channel has two hundred fifty six bytes allocated to it within the ingress FIFO 214 for storing data. Alternatively, the ingress FIFO 214 may be a variable length circular buffer for each channel wherein the size of each channel buffer may be assigned by software. The ingress FIFO 214 holds the data for a "frame" of information (e.g., 32 or 64 bytes) before it is sent to a processor (not shown) via a packet handler 216. For example, a write operation occurs into the ingress FIFO 214 when four bytes are accumulated in the input register FIFO 212 for a particular channel. By properly checking the channel address for each set of bytes, as necessary, data from different channels may be written into appropriate channel buffers of the ingress FIFO 214. Since the data protocol (e.g., HDLC or ATM) for each channel is known in advance, only the byte addresses are necessary to implement the appropriate context switching to store valid user data in appropriate locations within the ingress FIFO 214.

In one embodiment, a read operation from the ingress FIFO 214 occurs when a channel buffer contains a threshold number of bytes (e.g., sixty four bytes) or when a packet end byte is identified and stored in respective channel buffer of the ingress FIFO 214. When either of these conditions occur, a request is sent to an I/O scheduler (not shown) which then sends the stored data to the packet handler 216. The packet handler 216 transfers the packet data from the I/O scheduler to a processor (not shown) and generates the necessary interface signals. The transmission of data from the ingress FIFO 214 to the processor is performed by the packet handler 216 in accordance with appropriate interface protocols that are well-known in the art. The packet handler 216 uses the start and end flags for each set of data bytes corresponding to a channel to delineate the packets and send each packet independently to the processor. Each time a packet, or packlet, starts, a header word is sent to the processor to identify the channel and at the end of each packet, a status word is sent.

FIG. 3 illustrates a block diagram of key elements of the byte processing unit 206 for processing HDLC bytes, in accordance with one embodiment of the invention. The byte processing unit 206 includes four parallel byte processing engines (BPEs) 302, 304, 306 and 308 for simultaneously receiving and processing four bytes received from the input scheduler 204 (FIG. 2). If the channel identified by the input scheduler 204 is designated as a HDLC protocol channel, the byte processing engines are instructed by software to implement HDLC processing on the received bytes. In accordance with the HDLC protocol, each BPE 302, 304, 306 and 308 determines whether the respective byte it is processing is a start flag (7Eh), an end flag (7Eh), a stuff byte (7Dh) or an abort byte. If a byte is identified as one of these types of bytes it is designated as a "drop byte" and the respective BPE 302, 304, 306 and 308 updates a respective byte status register (BSR) 310*a–d*, 312*a–d*, 314*a–d* or 316*a–d* contained in the state memory 210. Bytes that are not designated as "drop bytes" are referred to herein as "valid bytes" or "user bytes." In the embodiment shown, the reference designations "a–d" correspond to four channels of incoming data wherein "a" corresponds to channel 0, "b" corresponds to channel 1, and so on. Therefore, BSRs 310*a*, 312*a*, 314*a* and 316*a* are the BSRs for channel 0, BSRs 310*b*, 312*b*, 314*b* and 316*b* correspond to channel 1, etc. Using well-known techniques of data routing and multiplexing, status data are stored in the appropriate BSRs in accordance with the channel numbers of the bytes associated with the status data. Similarly, the state memory 210 further includes data buffers or registers 318*a–d*, 320*a–d*, 322*a–d* and 324*a–d*, for storing respective byte values, wherein the reference characters "a–d" indicate corresponding channels 0–3 within the SONET payload, in accordance with one embodiment of the invention. For ease of discussion, the reference characters "a–d" are omitted below. It is understood that when discussing BSRs 310–316 and/or the data registers 318–324, only those BSRs and data registers corresponding to the respective channel from which bytes are received are being discussed.

Each BPE 302, 304, 306 and 308 processes in parallel a respective byte from an incoming pipeline corresponding to a channel. Each BPE 302–308 then generates byte status data for a respective byte and transmits this byte status data, along with the respective bytes, to the input formatter 208. The byte status data identifies respective bytes as flag bytes, stuff bytes, abort bytes or valid bytes. For each valid byte, a write enable signal is generated. In one embodiment, these write enable signals are "stored" as a bit value in corresponding byte status data. Flag bytes, stuff bytes and abort bytes are "drop bytes" and no write enable signal is generated for these bytes. In addition to transmitting the byte status data to the input formatter 208, each BPE 302–308 transmits the byte status data to byte status registers (BSRs) 310–316 to be accessed and processed by a subsequent pipeline of bytes received from the same channel. The bytes are also sent to respective data buffers 318–324, for use during processing of bytes in the immediately succeeding cycle, or pipeline, for that channel. The BSRs 310–316 and data registers 318–324 are part of the state memory 210 (FIG. 2) discussed above. In one embodiment, each BSR 310–316 may contain data indicative of one the following byte statuses: a start flag; an end flag; an abort byte; a stuff byte; and a WE signal. A WE signal indicates that the byte constitutes valid data to be further processed by a processor.

During HDLC processing, the start and end bytes for a packet are determined by checking the location of flags (7Eh). If a byte immediately preceding the current byte is a flag, and the current byte itself is not a flag, then the current byte is designated as a start byte of a packlet. If the byte immediately succeeding the current byte is a flag and the current byte itself in not a flag, then the current byte is designated as an end byte of the packlet or packet. If the byte immediately preceding the current byte is an escape character or stuff byte (7dh), then the current byte is EXORed with the value 20h before it is sent to the input register FIFO 212 (FIG. 2) by the input formatter 208. The above designations of start and end bytes and logic operations are in accordance with well-known HDLC protocols.

If during a single cycle or "pipeline," in which four bytes are simultaneously processed in parallel by the four parallel BPE's 302–308, a flag is identified and its immediately succeeding or preceding byte is not a flag, the BPE's send appropriate status signals to their neighboring BPE's to identify either a start or end byte of the packlet. As used herein, a "neighboring" BPE or byte is one that is immediately to the left or immediately to the right of a respective BPE or byte. The identified flag is then designated as a "drop byte." For example, if the first byte processing engine 302 (BPE0) identifies a flag, it will send a "flag indication signal" to its neighbor, the second byte processing engine 304 (BPE1), to alert it that it may be processing the start byte of the packet if that byte is not also a flag. If byte 1 being processed by BPE1 304 is also not a flag, that byte is designated as a start byte of the packet and a WE signal is generated for that byte. This WE signal, along with its corresponding byte value is then sent to the input formatter 208 via communication lines 340. In one embodiment, lines 340 include four parallel lines to simultaneous transmit byte values and corresponding WE signals from the four parallel BPEs 302–308 to the input formatter 208. Through the implementation of appropriate logic functions, the input formatter 208 designates byte 1 as a start byte by setting an appropriate bit in a three-bit status code. Thereafter, byte 1 and its three-bit status code are sent to a corresponding eleven-bit register within the input register FIFO 212.

Figure 4:
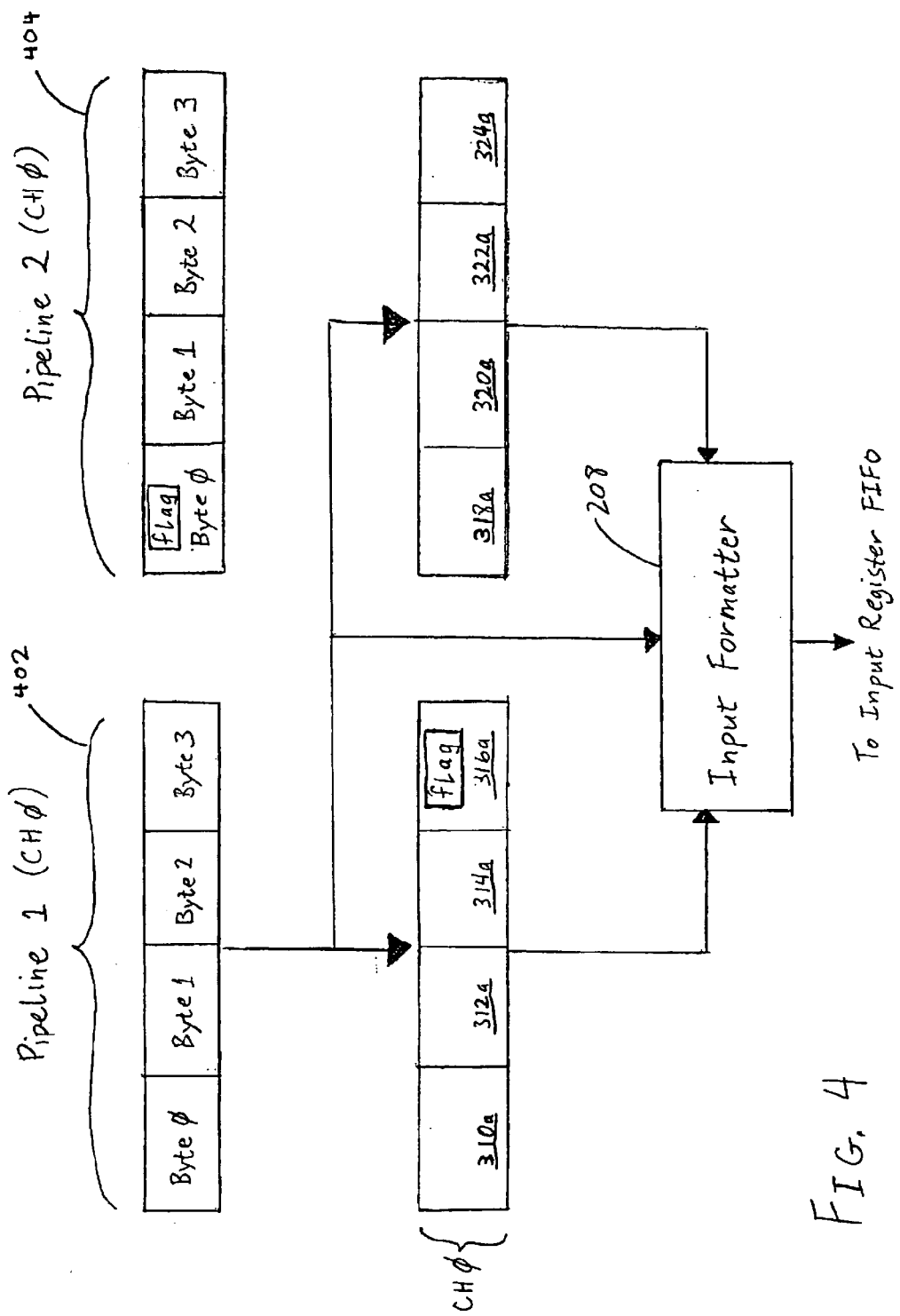
FIG. 4 illustrates a block diagram of two pipelines of four bytes each as they are processed, in accordance with a HDLC protocol, by the four parallel byte processing engines of FIG. 3.

Because start and end flags, and stuff bytes, can occur at the byte 0 and byte 3 locations of an incoming set (i.e., pipeline) of four bytes, two pipelines of data bytes and the state memory 210 are used to allow designation of delineation bytes as the first byte (i.e., byte 0) of the current pipeline, or to allow designation of delineation bytes as the last byte (i.e., byte 3) of the previous pipeline. Bytes located at the byte 0 and byte 3 positions are referred to herein as the "first byte" and the "last byte," respectively, of a given pipeline. Referring to FIG. 4, an exemplary status condition is illustrated. A first pipeline of bytes (Bytes 0–3) are received from channel 0 during a first pipeline 402 of the byte processing operation. Assume for this example that none of these four bytes are "drop bytes." Therefore, these bytes are sent to the input formatter 208 along with respective write enable signals for each byte. However, as shown in FIG. 4, in a previous pipeline of bytes received from channel 0, a flag (7eH) occupied the last byte of that previous pipeline, i.e., byte 3. The byte processing unit 206 of the present invention remembers this state by storing the byte status of each byte of a previous cycle in corresponding BSRs 310–316 of the state memory 210. Therefore, if byte 0 of the current pipeline 402 is not also a flag, it must be a start byte for the next packlet in channel 0. The input formatter can ascertain the status of byte 3 of the previous pipeline by accessing the BSRs 310–316 via communication line(s) 342. Through the implementation of appropriate logic functions, the input formatter 208 designates the status of byte 0 as a start byte and stores this status data in a three-bit status code corresponding to that byte. The input formatter 208 then transmits byte 0 along with its three-bit status code to the input register FIFO 212.

At the next cycle or pipeline 404, byte 0 contains a flag (7Eh). During this cycle, the contents of the BSRs 310–316 of the state memory 210 holds the byte status information of the first cycle or pipeline 402. Additionally, the data registers 318–324 now contain the byte values of the first pipeline 402. If the last byte (i.e., byte 3) of the previous cycle 402 is not also a flag, then it is determined that it is an end byte of the packlet in channel 0. By implementing appropriate logic functions, the input formatter 208 designates the status of byte 3 of the first pipeline 402 as an end byte by setting an appropriate bit in a three-bit status code. This status code is then stored in the input register FIFO 212 along with byte 3 of the previous pipeline. In one embodiment, if the input formatter 208 receives a start byte location and an end byte location which indicates that a packlet within a channel is not at least four bytes in length, then all bytes within that packet are designated as "drop bytes," overriding any WE signals generated by the BPEs 302–308 for those bytes.

As explained above, the input formatter 208 receives byte values and byte status data from the BPEs 302–308. The input formatter 208 can further access byte status data for previous pipelines from respective BSRs 310–316. By implementing appropriate logic functions, easily implemented by those of ordinary skill in the art, the input formatter 208 can determine which bytes constitute flag bytes, start and end bytes, stuff bytes, or abort bytes. The input formatter 208 generates a three-bit status code indicative of one or more of these statuses. The input formatter 208 then transmits valid data bytes for the packlet along with the three-bit status codes to the input register FIFO 212 for further processing. The three-bit status codes identify the start and end bytes of the packlet. In one embodiment, the input formatter 208 transmits up to four bytes (thirty-two-bit data) to the input register FIFO 212 along with a three-bit status code for each byte. In a further embodiment, this three-bit status code is user configurable and may indicate that a byte is start byte, an end byte, or an abort byte. The bytes and their corresponding status codes are stored in the input register FIFO 212 in banks or registers allocated for each channel.

As described above, in one embodiment, the input register FIFO 212 includes eight rows of eleven-bit register FIFOs for each channel. Therefore, each eleven-bit register stores a byte and a corresponding three-bit status code for that byte received from the input formatter 208. When four bytes are accumulated in any one channel of the input register FIFO 212, or when an end byte is stored and no new packet is being recieved in the next immediate cycle, the data from that channel is moved to a corresponding channel buffer of the ingress FIFO 214. In one embodiment, when a respective channel buffer of the ingress FIFO 214 is 64 bytes full or contains an end byte, the ingress FIFO 214 sends a request to an I/O scheduler (not shown) which then sends the packet data to the packet handler 216 (FIG. 2) for subsequent transmission to a data processor (not shown) for processing.

Figure 5:
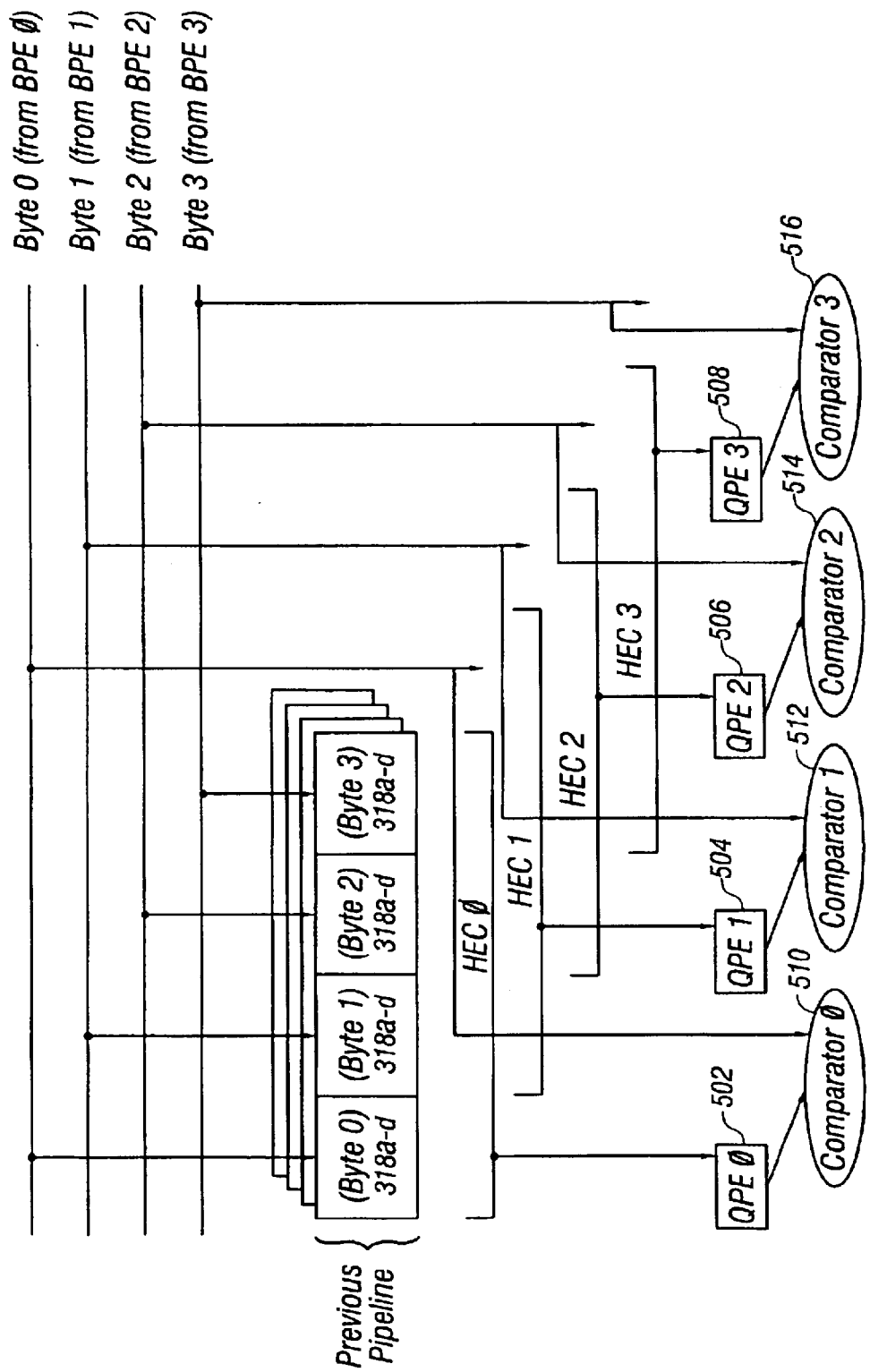
FIG. 5 illustrates a block diagram of the byte processing unit of FIG. 2 including four quad-byte processing engines and four HEC comparators, in accordance with one embodiment of the invention.

When a pipeline of bytes received by the parallel BPE's are asynchronous transfer mode (ATM) cell bytes, the processing of these bytes must be in accordance with a cell delineation protocol designed for ATM cell transmission. FIG. 5 illustrates a block diagram of the relevant components of the byte processing unit 206 of FIG. 2 for processing ATM cell bytes, in accordance with one embodiment of the invention. The byte processing unit 206 includes four quad-byte processing engines (QPEs) 502, 504, 506 and 508 that each process four bytes during a single clock cycle to calculate respective cell delineation values, otherwise referred to herein as header error correction (HEC) values. The byte processing unit 206 further includes four parallel comparators 510, 512, 514 and 516 for comparing cell delineation values calculated by respective QPEs 502–508 with corresponding bytes received during a second pipeline. As shown in FIG. 5, a single line is drawn to indicate connections between the data registers 318–320, the QPEs 502–508, the comparators 510–516 and the BPEs 302–308 (FIG. 2). However, it is understood that the single connection lines of FIG. 5 may represent either single conductive lines or parallel conductive lines, as would be readily apparent to those of ordinary skill in the art, to transmit data in accordance with the objectives of the invention described below.

The first QPE 502 retrieves four bytes of a previous pipeline, which are stored in a respective channel of data registers 318–324, to calculate a first HEC value (HEC1). The first comparator 510 then compares this HEC1 value with the value of the first byte (byte 0) received in a current pipeline. If HEC1 matches (e.g., equals) the value of byte 0 in the current pipeline, then byte 0 of the previous pipeline is designated as an ATM start byte. The second QPE 504 computes a second HEC value (HEC2) by processing bytes 1–3 of the previous pipeline and byte 0 of the current pipeline. The second comparator 512 then compares HEC2 with the value of byte 1 of the current pipeline. If HEC 2 matches byte 1 of the current pipeline, then byte 1 of the previous pipeline is designated as a start byte. The third QPE 506 computes a third HEC value (HEC3) by processing bytes 2 and 3 of the previous pipeline and bytes 0 and 1 of the current pipeline. The third comparator 514 then compares HEC3 to the value of byte 2 of the current pipeline to determine if byte 2 of the previous pipeline is a start byte. Similarly, The fourth QPE 508 computes a fourth HEC value (HEC4) by processing byte 3 of the previous pipeline and bytes 0–2 of the current pipeline. The fourth comparator 516 then compares HEC4 to the value of byte 3 of the current pipeline to determine if byte 3 of the previous pipeline is a start byte.

The above process repeats with successive pipelines of bytes until an ATM start byte is identified. Until this event occurs, all prior processed bytes are designated as drop bytes. Once a start byte is identified, the remaining bytes of the respective ATM cell are easily located in accordance with the well-known ATM cell structure. In one embodiment, corresponding WE signals are generated and transmitted to the input formatter 208 for bytes designated as start bytes and/or valid user data. After a start byte is identified, ATM cell delineation algorithms are executed on the ATM cell(s) which are thereafter transmitted to a processor for further processing.

Figure 6:
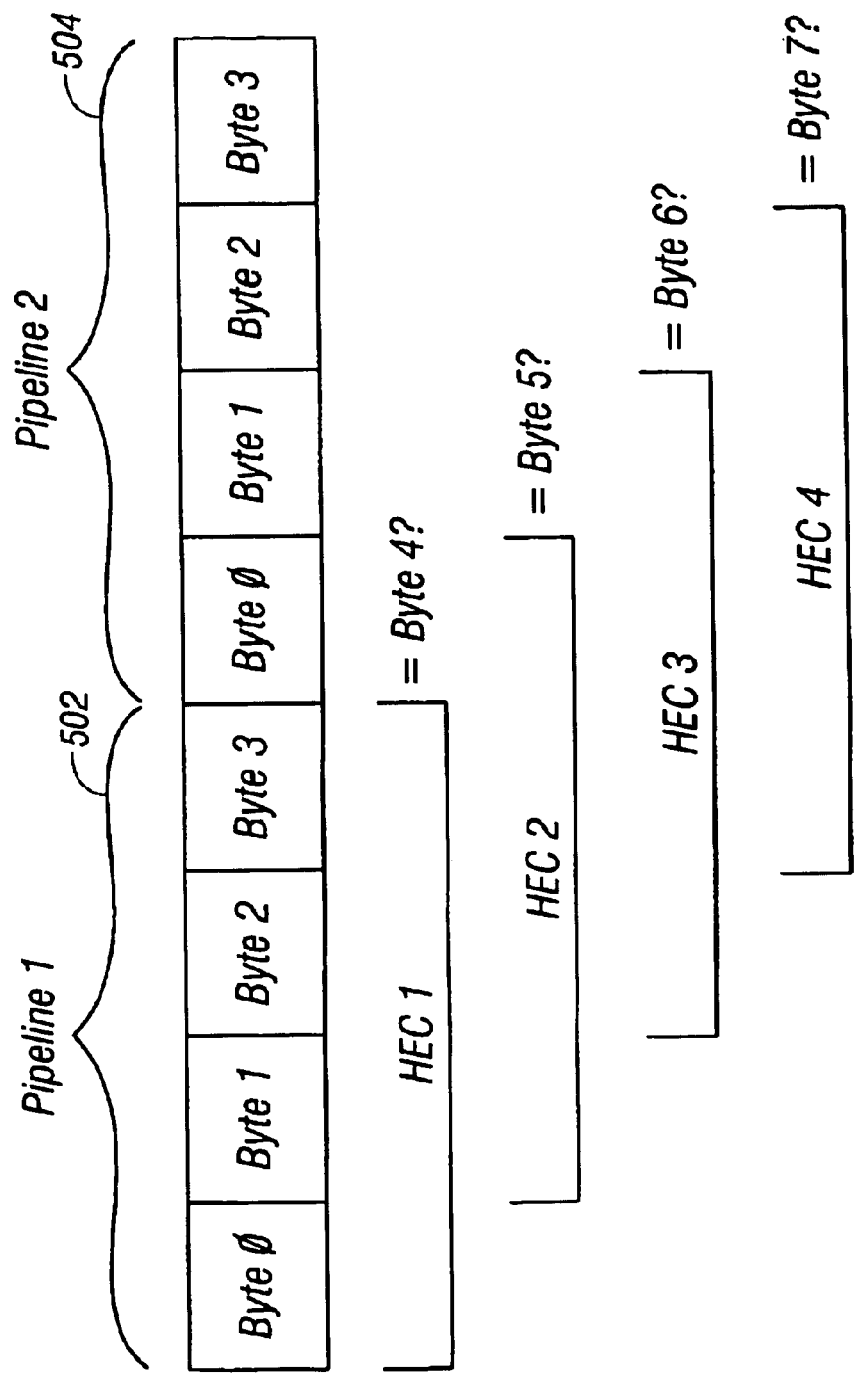
FIG. 6 illustrates a block diagram of two pipelines of four bytes each as they are processed, in accordance with a cell delineation algorithm for ATM cells, by the four quad-byte processing engines of FIG. 5.

FIG. 6 illustrates a logic diagram for performing cell delineation processing using two pipelines of bytes, each pipeline containing four bytes of ATM cell data, in accordance with the one embodiment of the invention. For purposes of this example, bytes in the second pipeline are designated as bytes 4–7. A first HEC value (HEC1) is computed by the first QPE 502 based on the first four bytes of the first pipeline 502 which is stored in a respective row/channel of data registers 318–324 of the state memory 210 (FIG. 2). The HEC1 value is then compared with the first byte (byte 4) of the second pipeline 504. If HEC1 matches (e.g., is equal to) byte 4, then byte 0 is designated as a start byte of the ATM cell. If HEC1 does not match byte 4, then byte 0 is not an ATM start byte and is designated as a "drop byte". A parallel calculation and comparison is performed on a second set of bytes offset one byte to the right of the first set of bytes. A second HEC value (HEC2) is calculated based on the next four bytes of the first and second pipelines 502 and 504 (i.e., bytes 1, 2, 3 and 4). If HEC2 matches byte 5, then byte 1 is designated as a start byte of the ATM cell. If HEC2 does not match byte 5, then byte 1 is not a start byte and is designated as a "drop byte." A third parallel calculation and comparison is performed on a third set of bytes offset one byte to the right from the second set of bytes. Thus, a third HEC value (HEC3) is calculated based on the next four bytes (i.e., bytes 2, 3, 4 and 5). If HEC 3 matches byte 6, then byte 2 is designated as a start byte of the ATM cell, otherwise it is designated as a "drop byte." Finally, a fourth parallel calculation and comparison is based on the next set of four bytes (i.e., bytes 3, 4, 5 and 6). The value of HEC 4 is compared to the value of byte 7 in the second pipeline 504. If there is a match, then byte 3 of the first pipeline 502 is identified as a start byte, otherwise it is designated as a "drop byte."

The above process continues with a next pipeline of bytes until a start byte is identified, wherein the above HEC calculations are performed with the bytes of the second pipeline 504 (bytes 4–7) replacing the bytes of the first pipeline 502 (bytes 0–3), and a third pipeline of four bytes replacing the second pipeline 504. Thus, by processing four bytes of a pipeline within a single cycle, the byte processing unit 206 of the present invention provides an efficient method and system for delineating and processing ATM cells. The above-described cell delineation protocol and the calculation of HEC values, as well as the comparison of HEC values with respective byte values, are well-known in the art and need not be described in further detail herein.

Thus, as described above, the invention provides a new method and system for efficiently and rapidly processing channelized streams of data by the use of parallel byte processing engines to delineate packets within each channel and extract valid user data, or other desired data, for further data processing. When processing HDLC bytes, the plurality of parallel byte processing engines further communicate with one another during a single cycle to implement necessary logic to identify "drop bytes" and delineate user signals within each data channel. When processing ATM cell bytes, the plurality of byte processing engines provide four bytes per cycle, or pipeline, to a plurality of quad-byte processing engines and a plurality of comparators which perform parallel cell delineation calculations and comparisons on eight bytes received during two successive pipelines for a particular channel. In this way, the invention provides increased bandwidth handling capacity.

Those skilled in the art will know, or be able to ascertain using no more than routine experimentation, many equivalents to the specific embodiments of the invention described herein. These equivalents are intended to be encompassed by the following claims.

What is claimed is:

1. An apparatus for processing bytes received from a data stream, comprising:

a plurality of parallel byte processing engines for receiving a first plurality of bytes from a data channel during a first cycle and for generating byte status data for each of said first plurality of bytes; and an input formatter, coupled to said plurality of parallel byte processing engines, for receiving said byte status data from said plurality of parallel byte, processing engines, wherein if one of said byte status data received from one of said plurality of byte processing engines indicates a flag byte, at least one of said first plurality of bytes processed by a neighboring byte processing engine from among said plurality of parallel byte processing engines is designated as a delineation byte wherein said byte status data includes a write enable status bit for respective ones of said first plurality of bytes identified as valid data, and wherein said input formatter further generates a byte status code for each of said first plurality of bytes identified as valid data, wherein said byte status code identifies at least one of said first plurality of bytes as a delineation byte.

2. The apparatus of claim 1 further comprising a plurality of byte status registers, each coupled to a respective one of said plurality of byte processing engines, each storing byte status data for a respective one of a prior plurality of bytes received by said plurality of parallel byte processing engines from said data channel during a prior cycle, wherein said input formatter designates a last byte of said prior plurality of bytes as an end delineation byte if said last byte is not a flag byte and a first byte of said first plurality of bytes is a flag byte.

3. The apparatus of claim 1 further comprising a plurality of byte status registers, each coupled to a respective one of said plurality of byte processing engines, each storing byte status data for a respective one of a prior plurality of bytes received by said plurality of parallel byte processing engines from said data channel during a prior cycle, wherein said input formatter designates a first byte of said first plurality of bytes as a start delineation byte if said first byte is not a flag byte and a last byte of said prior plurality of bytes is a flag byte.

4. The apparatus of claim 1 further comprising an input register FIFO, coupled to said input formatter, for storing said first plurality of bytes identified as valid data and corresponding byte status codes for each of said stored bytes.

5. The apparatus of claim 1 further comprising:
a plurality of data registers, each coupled in respective one of said plurality of parallel byte processing engines, each for storing a byte value of a respective one of a prior plurality of bytes received by said plurality of parallel byte processing engines from said data channel during a prior cycle;
a plurality of parallel quad-byte processors, each coupled to at least one of said plurality of data registers, for calculating respective cell delineation values; and
a plurality of comparators, each coupled to a respective one of said plurality of parallel quad-byte processors and a respective one of said plurality of parallel byte processing engines, wherein each of said plurality of comparators receives a respective one of said first plurality of bytes from a respective one of said parallel byte processing engines and compares a respective one of said first plurality of bytes to a respective one of said cell delineation values to determine whether a respective one of said prior plurality of bytes constitutes an ATM start byte.

6. An apparatus for processing bytes received from a data stream, comprising:
parallel byte processing means for receiving a first plurality of byte from a data channel during a first cycle and for generating byte status data for each of said first plurality of bytes;
an input formatter means, coupled to said parallel byte processing means, for receiving said byte status data from said parallel byte processing means, wherein if a respective one of said first plurality of bytes is identified as a flag byte, a neighboring one of said first plurality of bytes is designated as a delineation byte;
data register means, coupled to said parallel byte processing means, for storing byte values for a prior plurality of bytes received by said parallel byte processing means from said data channel during a prior cycle; and
parallel quad-byte processing means, coupled to said data register means, for calculating respective cell delineation values; and comparator means, coupled to said parallel quad-byte processing means and to said parallel byte processing means, for receiving said first plurality of bytes from said parallel byte processing means and comparing a respective one of said first plurality of bytes to a respective one of said cell delineation values to determine whether a respective one of said prior plurality of bytes constitutes an ATM start byte.

7. The apparatus of claim 6 further comprising a status register means, coupled to said parallel byte processing means, for storing byte status data for a prior plurality of bytes received by said parallel byte processing means from said data channel during a prior cycle, wherein said input formatter means designates a last byte of said prior plurality of bytes as an end delineation byte if said last byte is not a flag byte and a first byte of said first plurality of bytes is a flag byte.

8. The apparatus of claim 6 further comprising a status register means, coupled to said parallel byte processing means, for storing byte status data for a prior plurality of bytes received by said parallel byte processing means from said data channel during a prior cycle, wherein said input formatter means designates a first byte of said first plurality of bytes as a start delineation byte if said first byte is not a flag byte and a last byte of said prior plurality of bytes is a flag byte.

9. The apparatus of claim 6 wherein said byte status data includes a write enable status bit for respective ones of said first plurality of bytes identified as valid data, and wherein said input formatter means further generates a byte status code for each of said first plurality of bytes identified as valid data, wherein said byte status code identifies at least one of said first plurality of bytes as a delineation byte.

10. The apparatus of claim 9 further comprising an input register means, coupled to said input formatter means, for storing said first plurality of bytes identified as valid data and corresponding byte status codes for each of said stored bytes.

11. A method of processing bytes received from a data stream, comprising:
receiving a first plurality of bytes from a data channel during a first cycle;
generating byte status data for each of said first plurality of bytes, wherein said byte status data indicates whether one of said first plurality of bytes constitutes a flag byte; and
processing said byte status data, wherein if a respective one of said first plurality of bytes is identified as a flag byte, a neighboring one of said first plurality of bytes is designated as a delineation byte,
wherein said byte status data includes a write enable status bit for respective ones of said first plurality of bytes identified as valid data, and wherein said method further comprises generating a byte status code for each of said first plurality of bytes identified as valid data, wherein said byte status code identifies at least one of said first plurality of bytes as a delineation byte.

12. The method of claim 11 further comprising:

storing byte status data for a respective one of a prior plurality of bytes, received from said data channel during a prior cycle, in a first buffer; and designating a last byte of said prior plurality of bytes as an end delineation byte if said last byte is not a flag byte and a first byte of said first plurality of bytes is a flag byte.

13. The method of claim 11 further comprising;

storing byte status data for a respective one of a prior plurality of bytes, received from said data channel during a prior cycle, in a first buffer; and designating a first byte of said first plurality of bytes as a start delineation byte if said first byte is not a flag byte and a last byte of said prior plurality of bytes is a flag byte.

14. The method of claim 11 further comprising storing said first plurality of bytes identified as valid data and corresponding byte status codes for each of said stored bytes in a buffer.

15. The method of claim 11 further comprising:

storing byte values for a prior plurality of bytes, received from said data channel during a prior cycle, in a data buffer;

calculating respective cell delineation values using at least one of said stored byte values for each calculation; and comparing a respective one of said first plurality of bytes to a respective one of said cell delineation values to determine whether a respective one of said prior plurality of bytes constitutes an ATM start byte.

* * * * *